United States Patent [19]

Barry

[11] Patent Number: 5,553,368

[45] Date of Patent: Sep. 10, 1996

[54] PIERCING GROMMET HAVING DETACHABLE TOOL FOR INSTALLATION

[75] Inventor: David M. Barry, Renton, Wash.

[73] Assignee: The Boeing Company, Seattle, Wash.

[21] Appl. No.: 372,742

[22] Filed: Jan. 13, 1995

Related U.S. Application Data

[62] Division of Ser. No. 91,388, Jul. 14, 1993, Pat. No. 5,435,679.

[51] Int. Cl.⁶ ............................ B23P 17/00; B23P 11/00; F16B 19/00; F16B 21/00
[52] U.S. Cl. ............................ 29/423; 29/432; 411/339; 411/509; 244/131
[58] Field of Search ........................ 411/82, 258, 338, 411/339, 508, 509, 930; 244/131, 132; 248/56; 29/423, 432, 453

[56] References Cited

U.S. PATENT DOCUMENTS

| | | | |
|---|---|---|---|
| 3,238,835 | 3/1966 | Rosenberg | 411/338 |
| 4,010,519 | 3/1977 | Worthing | 411/258 X |
| 4,842,465 | 6/1989 | Pease | 411/337 |
| 4,878,792 | 11/1989 | Frano | 411/339 |
| 5,069,586 | 12/1991 | Casey | 411/339 |

Primary Examiner—Neill R. Wilson
Attorney, Agent, or Firm—Conrad O. Gardner

[57] ABSTRACT

A piercing grommet which pierces an insulation blanket. A snap-on retainer slides over a spiked portion of the piercing grommet and snaps in place adjacent the bottom of the spike. The spike can then be removed. A seal is created by contact adhesive between the insulation blanket and the grommet in order to prevent moisture ingress.

1 Claim, 2 Drawing Sheets

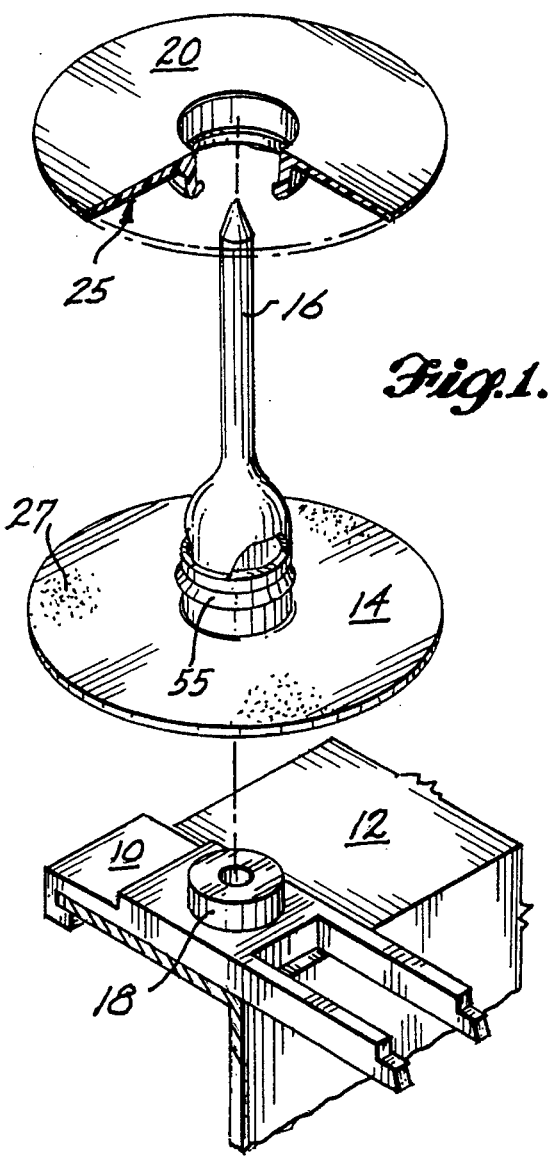
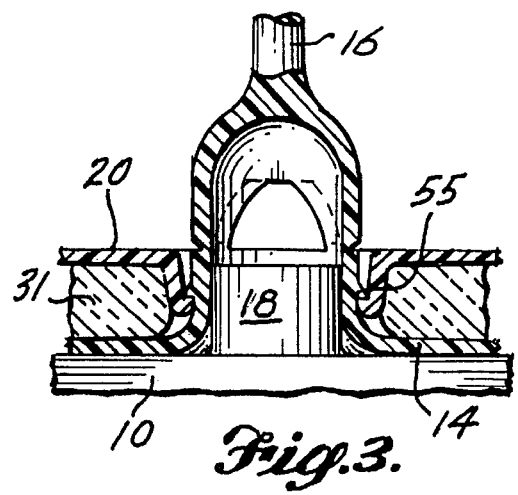
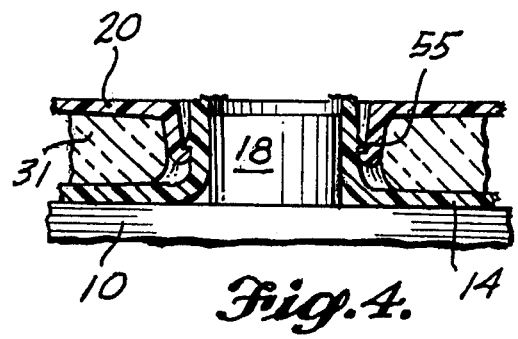
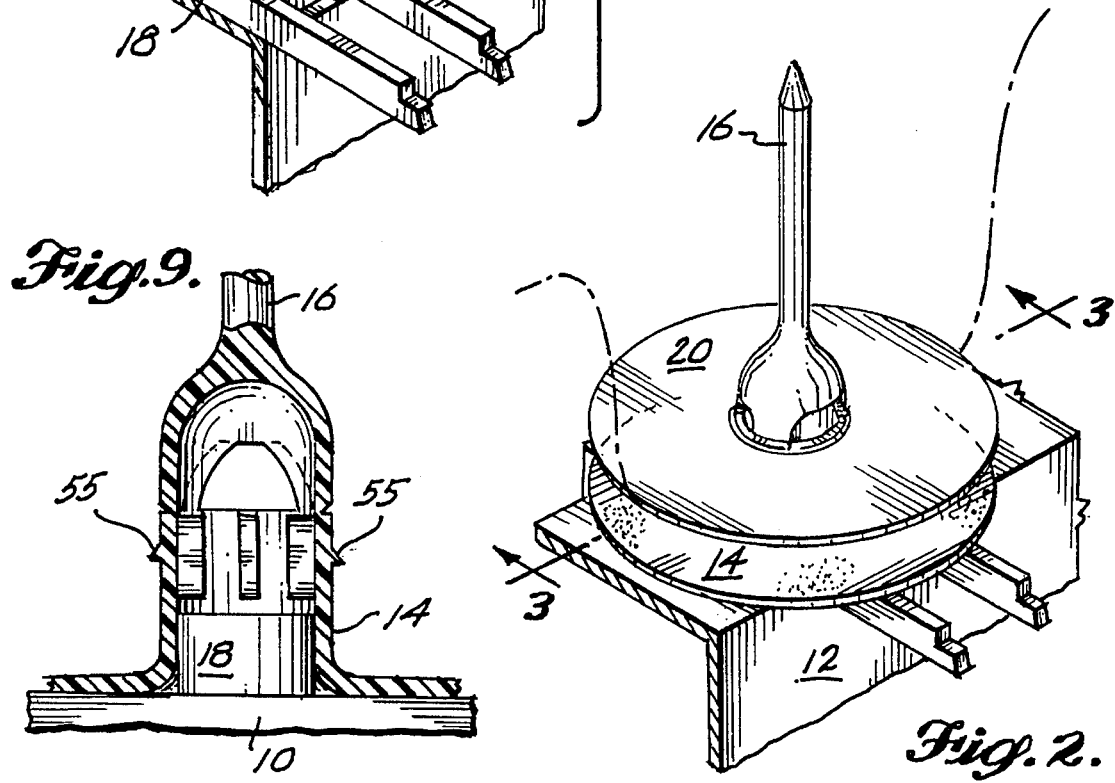

PIERCING GROMMET HAVING DETACHABLE TOOL FOR INSTALLATION

This application is a division of application Ser. No. 08/091,388, now U.S. Pat. No. 5,435,679 (filed Jul. 14, 1993).

BACKGROUND OF THE INVENTION

The present invention relates to grommets for insulation blankets, and more particularly to grommets for preventing moisture ingress through the blanket.

In aircraft, many system wiring and other attachments must travel through the insulation blankets to secure their equipment to the body of the airplane. The problem is to reliably seal these penetrations as to preserve the functionality of the blanket. Currently in some arrangements, wiring punctures blankets in which a screw connects a P-clamp to the attachment under the blanket. This results in an unsealed blanket allowing water and other liquids to wick into the blanket, which is unacceptable. In some cases, insulation blankets are sealed with a taped construction method to prevent liquid absorption by the batting, which results in significant water weight carried by the airplane. Puncturing these blankets is prohibited due to the tremendous time and cost involved in such insulation construction technique.

A prior attempt to solve this problem was to facilitate the attachment points with a lightweight grommet installed in the blanket at fabrication to allow a P-clamp screw assembly to attach directly onto the attachment. This method relies on a dataset storage area for designers to locate the grommet on the blanket via a template. This is not a practical solution due to factory installation tolerance and incomplete, inaccurate models resulting from late changes. Such placement of the attachments on the airplane in the factory is not accurate enough to reliably match the blankets' preinstalled grommets, resulting in a rejected part or a poor installation.

In the patent literature, U.S. Pat. No. 5,069,586 to Casey describes a two-part self-locking grommet. The grommet comprises an external sleeve and an internal sleeve, each with a formed flange at one end. The bore diameter of the external sleeve is large enough so that the internal sleeve could be inserted, formed flanges at opposite ends. A radiused annular lip is an integral part of the outer diameter of the internal sleeve. When inserted into the external sleeve, the lip snaps into a radiused annular groove and the grommet is locked together. In the case of an aircraft application, an opening for the grommet would need to exist prior to grommet insertion. Prevention of ingress of moisture is not described.

In contrast, the present invention utilizes a two-part snap fit grommet. The snap fit area consists of a sharp annular lip on the internal part which locks into an external washer. One part, hereinafter described, pierces an opening through the material which is to accept the grommet. A retainer is installed onto the piercing part of the grommet, slid down until a snap fit is achieved and the two parts are joined. The piercing tool is then snapped off at a predetermined parting plane located just above the snap fit area.

While aforementioned U.S. Pat. No. 5,069,586 and the present invention utilize a part which snap fits into another part, the patent describes a stand-alone grommet, in contrast to the present invention which is press fit onto a stronger clip or bracket with a standoff. In further contrast, the U.S. Pat. No. 5,069,586 patent also relies on the prior existence of a hole in the material where it is to be inserted, in contrast to the present integral piercing tool.

U.S. Pat. No. 4,842,465 (Pese, et al.) shows several embodiments of a retaining system whereby an insulation blanket is pushed onto a metal stud which is welded to a wall or support. The stud is machined to a smaller diameter in several places along the length. Insulation is held securely with two retainers that lock onto the stud through a keyhole opening. The stud is left intact after the installation is complete, in contrast to the piercing portion of the present invention which is snapped off at a predetermined fracture plane. The U.S. Pat. No. 4,842,465 patent utilizes a locking mechanism which relies upon the retainers sliding onto the stud at a section change on the stud. Prevention of moisture ingress is not described. The U.S. Pat. No. 4,842,465 patent utilizes the principle of snapping on at a section change, but in contrast, in this case the piercing portion has a sharp annular lip and the retainer snaps onto the lip, also. The welded stud shown in the U.S. Pat. No. 4,842,465 patent is permanent, whereas in the present invention, relocation to a different location is possible.

SUMMARY OF THE INVENTION

An object of the present invention is the utilization of a piercing grommet arrangement which solves a misalignment problem between pre-installed insulation grommets and attachments on aircraft stringers.

It is another object of the present invention to provide a piercing grommet structure which prevents moisture ingress at the attachment points where a penetration is made into an aircraft insulation blanket.

The present invention includes a piercing nonmetallic grommet which attaches to the aircraft stringer. The insulation blanket is pierced by the spike of the piercing grommet. A snap-on retainer slides over the spike and snaps in place near the bottom of the spike. The spike portion is removed. Contact adhesive creates a seal between the insulation blanket and the grommet in order to prevent moisture ingress.

BRIEF DESCRIPTION OF THE DRAWINGS

FIG. 1 is an exploded isometric view of a preferred embodiment of the present piercing grommet assembly;

FIG. 2 is an in-place isometric view of the present piercing grommet assembly with insulation blanket removed to show the blanket cavity;

FIG. 3 is a partial vertical section with parts in elevation of the present piercing grommet assembly taken along line 3—3 of FIG. 2;

FIG. 4 is a view similar to FIG. 3; however, showing the piercing tool portion of the present piercing grommet assembly detached by breaking off by the installation mechanic.

FIG. 9 is a view similar to FIG. 3; however, showing a partial vertical section of an alternating embodiment of the present piercing grommet assembly in which radial stiffening webs are provided to extend the height of the assembly.

DETAILED DESCRIPTION OF THE INVENTION

Figure 5:
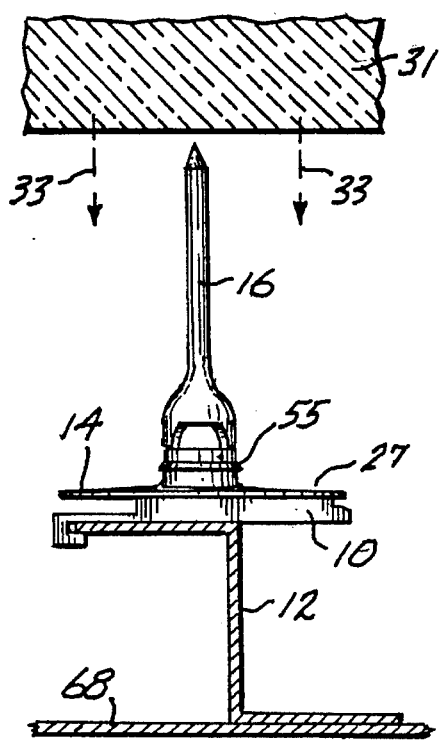
FIGS. 5, 6, 7, and 8 are vertical elevations illustrative of the installation sequence [sequence of method steps for installation] of the present piercing grommet assembly to retain an insulation blanket in spaced-apart relationship with respect to aircraft structure comprising an aircraft stringer; and, skin.
Figure 6:
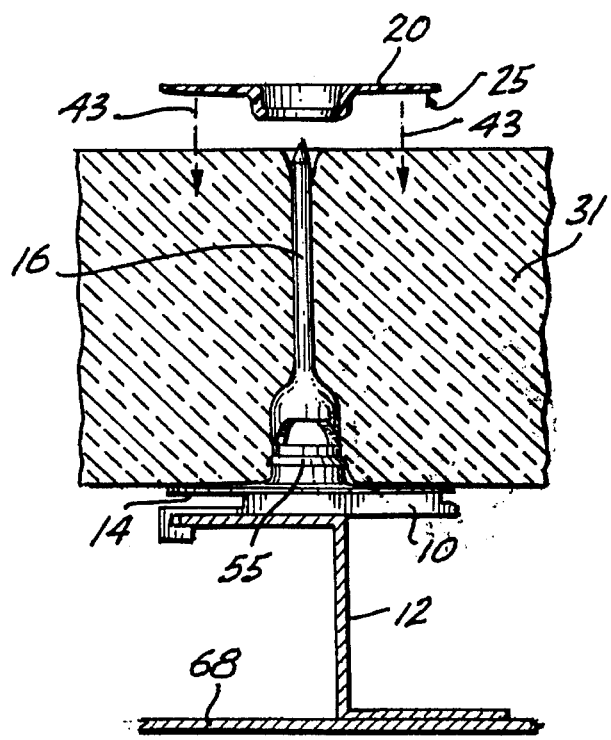

In FIG. 1 it can be seen that the present piercing grommet assembly comprises:

a mounting bracket 10 which clips onto an aircraft stringer 12 by the snapping-on action of the installer mechanic; a standoff disk support member 14 having a tool piercing portion 16 which is seated on projection portion 18 of mounting bracket 10; and apertured disk member 20 which is coaxially disposed about tool piercing portion 16 and snap-fitted down by the installation mechanic onto standoff disk support member 14. This sequence of steps in the installation of the present piercing grommet assembly is seen in FIGS. 5, 6, 7, and 8.

Figure 7:
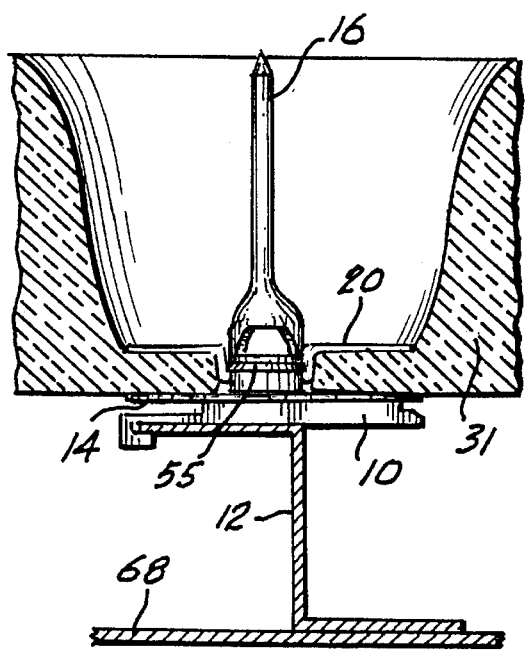
Figure 8:
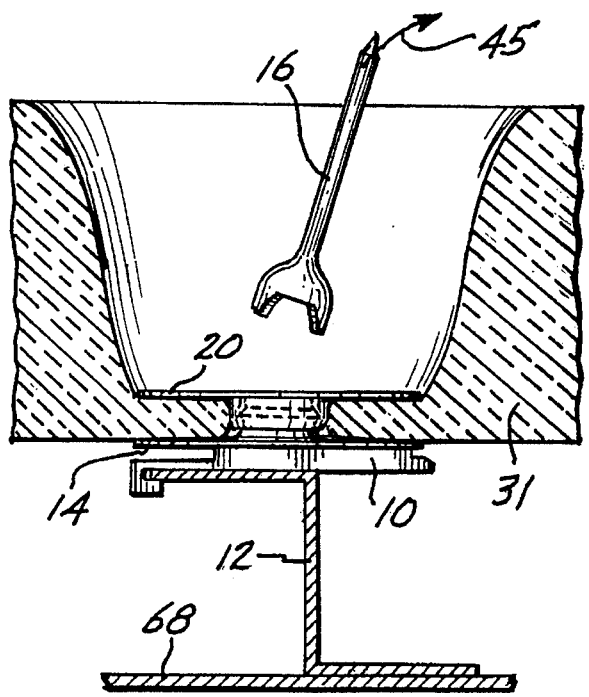

A pressure sensitive adhesive tape 27 (as seen in FIGS. 1 and 5) is found on the inner surface of standoff disk support member 14, and forms a seal with insulation blanket 31 in the step shown in FIG. 5 when insulation blanket 31 is installed down over tool piercing portion 16 by the installation mechanic (in the direction represented by arrows 33). In the next step shown in FIG. 6, pressure sensitive adhesive coating 25, found on the inner surface of apertured disk member 20, forms a seal with insulation blanket 31 as apertured disk member 20 slides down tool piercing portion 16 (in the direction depicted by arrows 43) against insulation blanket 31. Final position of assembly of the present piercing grommet assembly is shown in FIG. 7, with FIG. 8 showing tool piercing portion 16 being detached as by breaking off by the assembly mechanic in the direction of arrow 45. Bulging portion 55 of standoff disk support member 14 provides for the map fit interlocking relationship between apertured disk member 20 and standoff disk support member 14, as seen more clearly by reference to FIGS. 3 and 4. Aircraft stringer 12 is attached to supporting aircraft body 68, as noted in assembly FIGS. 5–8. Benefits and advantages of the present invention include the following:

1. Eliminates any misalignment problem associated with predetermined grommets.
2. Insulation blankets are sealed inboard and outboard.
3. A closed water path is provided, thereby preventing liquid dripping through the insulation blanket into the passenger cabin of an aircraft.
4. Blanket fabrication shop not required to install grommets, thereby simplifying installation and saving fabrication time and cost.
5. Insulation blankets replaced easier than grommeted types without incurring damage during the process.
6. A standoff disk support member in cooperative arrangement with a mounting bracket holds insulation blankets a predetermined distance from the aircraft structure, thereby avoiding corrosion problems.
7. Aircraft installation mechanics can access all attachments, current configuration, and flexibility without removing the insulation blankets. Switching interior configurations does not require taking off insulation blankets to find attachment points, thereby resulting in significant time and cost savings.
8. The installation tool is a part of the assembly and is detached and discarded after installation.

Further alterations and modifications will become apparent from the specification and drawings, however the scope of the invention is to be interpreted only in view of the appended claims.

What is claimed is:

1. A method of installing an insulation blanket on an aircraft stringer comprising the steps of:

clipping a mounting bracket onto the aircraft stringer;

press-fitting a standoff disk support member on said mounting bracket;

positioning the insulation blanket down over a blanket piercing portion of said standoff disk support member;

coaxially disposing an apertured disk member about the blanket piercing portion of said standoff disk support member in snap-fit relationship with said standoff disk support member; and then, breaking off said tool piercing portion of said standoff disk support member.

* * * * *